(No Model.)
H. M. BYLLESBY.
FISHING REEL.
No. 470,178. Patented Mar. 8, 1892.
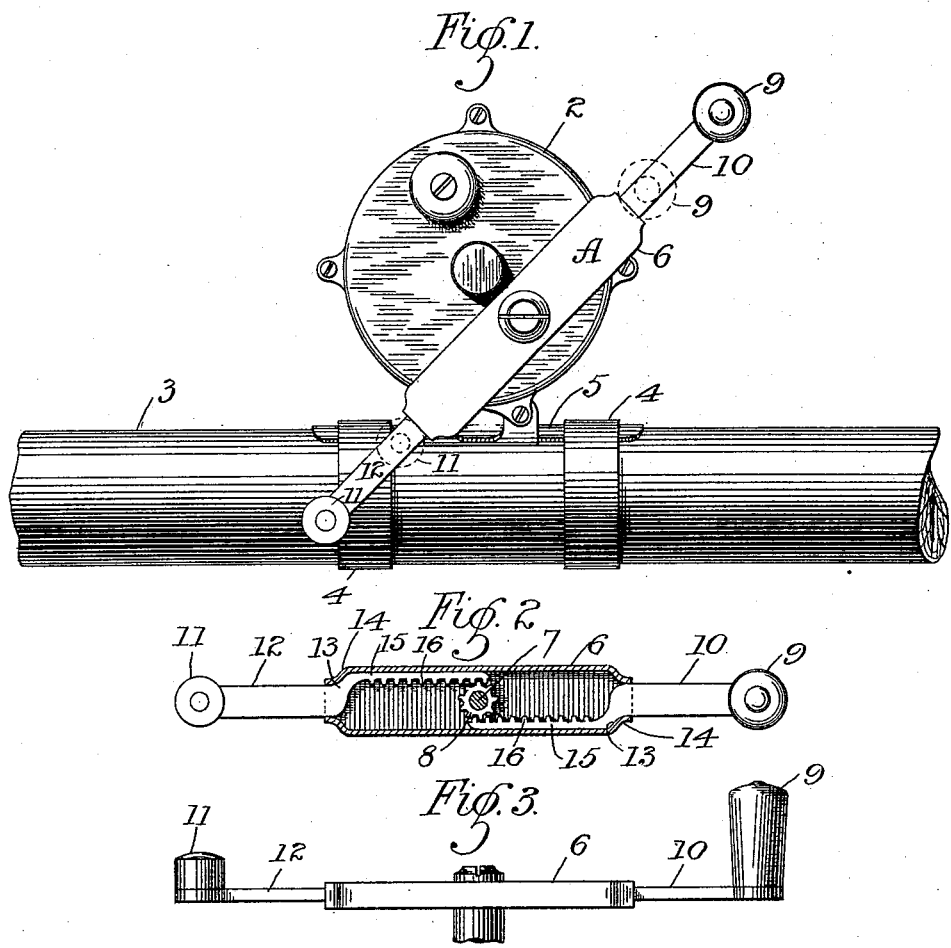
Witnesses:
C. L. Caldwell.
A. Mar Walsh.
Inventor:-
Henry M. Byllesby,
per Paul [illegible]
Attorneys.

UNITED STATES PATENT OFFICE.

HENRY M. BYLLESBY, OF ST. PAUL, MINNESOTA.

FISHING-REEL.

SPECIFICATION forming part of Letters Patent No. 470,178, dated March 8, 1892.

Application filed October 5, 1891. Serial No. 407,729. (No model.)

*To all whom it may concern:*

Be it known that I, HENRY M. BYLLESBY, of St. Paul, Ramsey county, Minnesota, have invented certain Improvements in Fishing-Reels, of which the following is a specification.

My invention relates to improvements in fishing-line reels adapted to be secured upon the fishing-poles, its object being to provide an improved form of reel crank or handle which, while as compact and convenient in form when not in use as the ordinary type, may be lengthened to give increased power for use and in order to carry the hand of the operator away from the reel and out of danger of contact with it. To this end I provide a straight hollow body or case secured centrally upon the crank-shaft, into one open end of which telescopes or slides the crank-handle, the bar carrying the counterbalancing-weight being similarly arranged in the opposite end of the case and so connected with the crank-handle as to be carried in or out with its movement in or out, the counterbalancing-weight thus always retaining its proper relative position to the shaft and handle.

My invention further consists in the construction and combination hereinafter described, and particularly pointed out in the claims.

In the accompanying drawings, forming part of this specification, Figure 1 is an end elevation of a fishing-reel in place upon the fish-pole, showing the arrangement of the reel handle or crank. Fig. 2 is a sectional plan view of the handle, and Fig. 3 is a side elevation of the same.

In the ordinary construction of reels of this class in order to make the instrument compact in form and of convenient size the crank arm or handle is made necessarily quite short, so as not to project beyond the reel. In winding the line upon the reel, therefore, particularly when attempt is being made to land a large or gamy fish, the winding is often difficult because of the shortness of the crank, and the fingers of the operator are liable to be injured by coming in contact with the reel or projections upon its end. By the use of my improved reel-crank both these objections are obviated, the handle being extensible to nearly double its normal length, thus increasing the power and carrying the handle wholly beyond the reel and its attachments, so that the fingers cannot come in contact with it in the operation of winding. The handle is also at all times exactly counterbalanced in whatever position it may be, since the counterbalancing arm or weight is extended or shortened equally with the corresponding change of length of the crank.

In the drawings, 2 represents a reel of ordinary type adapted to be secured upon the pole 3 by means of the rings or collars 4, sliding over the clip 5, rigidly secured to the reel.

Mounted upon the shaft 7 at the end of the reel is a crank A, the shaft being connected in the ordinary manner with the reel, which is not shown, as it forms no part of my present invention. The crank A is made up of the straight hollow body or case 6, through the center of which passes and is secured the crank-shaft 7. Upon this shaft and within the case is loosely mounted the pinion 8. The handle 9 is secured to the end of the arm 10, which is slidable in one end of the case. The counterbalancing-weight 11, mounted upon a similar arm 12, is slidable in like manner in the other end of the case. The arms 10 and 12 are each provided with a shoulder 13, which strikes against the narrowed end or neck 14 of the case as the arm is drawn out, thus serving as a stop to prevent the arm from being entirely withdrawn. The inner end 15 of each arm is narrowed and slides close against one side of the case between it and the pinion and is provided with a rack 16, which meshes with the teeth of the pinion, the narrowed ends of the two arms lying on opposite sides of the case and engaging opposite teeth of the pinion. On drawing the handle outward its rack engages the pinion and turns it on the shaft 7, causing it to engage the rack on the other arm and thus carry the arm and counterbalancing-weight outward with equal movement and to the same distance as the handle. Similarly the arm 10, when pushed in, carries the counterbalancing-weight, whereby the handle and weight are always kept at the same relative distance from the pivot.

I claim—

1. In a device of the class described, the combination, with the reel, of an extensible crank and an extensible counterbalancing-arm, substantially as described.

2. The combination, with the reel, of the extensible crank, the extensible counterbalancing-arm, and means whereby with the extending or shortening of the crank the counterbalancing-arm is simultaneously and equally extended or shortened, substantially as described.

3. The combination, with the reel and the crank-shaft, of the hollow case or body secured centrally upon and at right angles to said shaft, the pinion mounted loosely upon said shaft within said case, and the arms sliding within said case and projecting, respectively, from the ends thereof and provided with similar racks engaging opposite teeth of said pinion, substantially as described.

In testimony whereof I have hereunto set my hand this 1st day of October, 1891.

HENRY M. BYLLESBY.

In presence of—
T. D. MERWIN,
A. M. WELCH.